Feb. 20, 1951   D. ENTWISTLE ET AL   2,542,492
PRODUCTION OF VISCOSE
Filed April 28, 1949
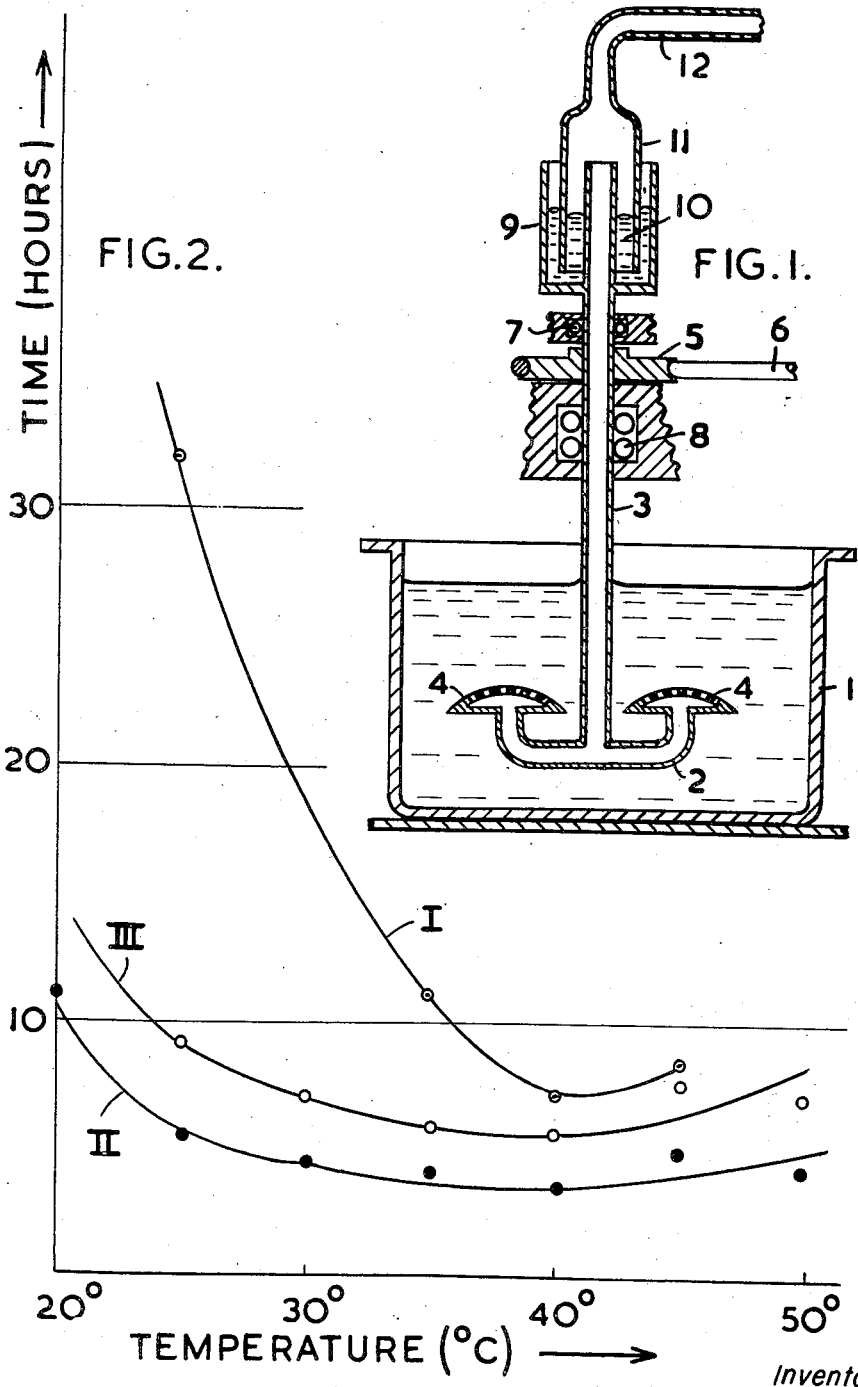
Inventors
Donald Entwistle
William Reginald Weigham
By their attorneys
Howson and Howson Patented Feb. 20, 1951

2,542,492

UNITED STATES PATENT OFFICE 2,542,492

PRODUCTION OF VISCOSE

Donald Entwistle and William Reginald Weigham, Coventry, England, assignors to Courtaulds Limited, London, England, a British company Application April 28, 1949, Serial No. 90,186. In Great Britain May 5, 1948

6 Claims. (Cl. 260—217)

This invention relates to the production of viscose.

The first stage in the production of viscose consists in the conversion of cellulose into alkali cellulose, the conversion usually being effected by steeping sheets of cellulose in an aqueous caustic soda solution containing from 17 to 25 per cent of caustic soda. The excess liquid is then pressed off and the alkali cellulose reduced to crumb form. It is the usual practice to allow the alkali cellulose crumbs to stand for some time before proceeding to the xanthation stage in order to allow it to "ripen," that is to permit a depolymerisation of the alkali cellulose to take place.

In order to reduce the ripening time, or even eliminate the need for ripening altogether, it has been proposed to effect the steeping process in the presence of oxygen or oxidising agents, for example, by bubbling oxygen, or more usually air, through the solution in which the cellulose is immersed. Thus, in British Specification No. 13,055/1914 it has been proposed to subject alkali cellulose to oxidation by supplying oxygen or other suitable oxidising agents to the alkali cellulose, so that the time required to mature the alkali cellulose can be greatly reduced. British Specification No. 14,675/1914 also describes a similar process for the production of matured alkali cellulose, wherein one or more catalysts or contact substances are added to assist the oxidation of the cellulose; examples of suitable catalysts or contact substances which are specified are the oxides or hydrates of iron, nickel and cobalt. In both these prior specifications it is stated that the oxidation may be effected at temperatures above 30° centigrade, a temperature of 40° centigrade being specified in one example of each specification.

It is the object of the present invention to provide an improved process for the production of alkali cellulose suitable for viscose production which reduces or eliminates the ripening period.

In accordance with the present invention, a process for the production of viscose comprises forming a slurry by steeping cellulose in an aqueous caustic soda solution containing from 17 to 25 per cent of caustic soda and also having dissolved therein a cobalt compound in a proportion not exceeding 40 parts by weight of cobalt per million parts by weight of solution, and passing a stream of oxygen or an oxygen-containing gas through the slurry whilst the temperature of the slurry is maintained within the range of 35° to 45° centigrade, until the fluidity of the cellulose is reduced to the value desired for viscose production.

The fluidity of the cellulose may be determined for the purposes of the present invention by using the standard cuprammonium viscosity test, namely by neutralising a sample of the alkali cellulose with acetic acid, forming a 1 per cent solution of the cellulose in cuprammonium solution and determining the viscosity of the solution obtained. This test is discussed in the report entitled "The Viscosity of Cellulose Solutions" issued by the Department of Scientific and Industrial Research in 1932 and published by His Majesty's Stationery Office, London, England. The fluidity values required for normal viscose production are usually within the range of 15 to 20 with a 1 per cent solution in cuprammonium, the lower figures being employed chiefly for producing yarns of high tenacity, for example tyre cord yarns.

In carrying out the process according to the invention, it is important that the stream of oxygen, preferably in the form of air, should be sufficient to maintain the slurry uniformly saturated with oxygen at all times during the steeping. It is preferred to introduce the oxygen in a rapid, finely-divided air stream, whilst the slurry is mechanically agitated, for example, by stirring.

The cobalt compound which is dissolved in the caustic soda steeping solutions, acts as a catalyst for the depolymerisation of the cellulose. Suitable cobalt compounds for use in the present invention are cobalt acetate and cobalt hydroxide.

It is important that the oxygen stream should be free from hydrogen sulphide which will react with the cobalt compound to form the insoluble cobalt sulphide and so deactivate the catalyst.

A number of experiments have been carried out to determine the effect of temperature on depolymerisation of the cellulose when carrying out the production of alkali cellulose in the presence of a cobalt catalyst in accordance with the invention. The experiments show that in a slurry process for the production of alkali cellulose the rate of depolymerisation is at a maximum between the temperature range of 35° to 45° centigrade; at temperatures above 45° centigrade, the reaction rate decreases sharply. The invention therefore has the advantage that it provides a working zone in which temperature variations have little effect on the reaction rate and control of the process is simplified. A further advantage of the invention is that the reaction may be halted and the cellulose in the slurry maintained at any desired fluidity simply by stopping the air flow.

The alkali cellulose produced in accordance with the invention may be pressed and the unripened alkali cellulose may then be converted into cellulose xanthate by the normal procedure without the need for a ripening period. The process according to the invention is therefore particularly useful in a continuous process for making viscose since the time interval between the pressing and xanthation operations is reduced to a minimum.

The invention is illustrated by reference to the accompanying drawings, in which:

Figure 1 shows in elevation a section through an apparatus suitable for the uniform aeration of the alkali cellulose slurry, and Figure 2 shows a graph indicating the effect of temperature on the time required to obtain an alkali cellulose of a desired cuprammonium fluidity.

In Figure 1, a tank 1 is provided with a stirrer 2 having a hollow shaft 3. Air is supplied through the hollow shaft 3 and bubbles out of perforated nickel thimbles 4 into the slurry contained in tank 1. The hollow shaft 3 is rotated in bearings 7 and 8 by the driving wheel 5, driven by belt 6. The upper end of the hollow shaft 3 is fitted with a mercury seal consisting of a cup 9 containing mercury 10 and an inverted cup 11. The edges of inverted cup 11 are below the surface of the mercury 10 but are out of contact with cup 9 and hollow shaft 3. Air is supplied through a pump (not shown) to hollow shaft 3 by pipe 12 connected to the inverted cup 11. The mercury seal may be replaced by a standard joint.

The data for the curves I, II and III shown in Figure 2 were obtained by carrying out a number of experiments at different temperatures and plotting the temperatures against the time in hours taken to obtain an alkali cellulose in which the cellulose has a particular cuprammonium fluidity.

Curve I was obtained by carrying out the reaction in the absence of cobalt, the final cuprammonium fluidity of the cellulose was 15. Curve II was obtained by carrying out the reaction in the presence of cobalt, the final cuprammonium fluidity was 15. Curve III was obtained by carrying out the reaction in the presence of cobalt, the final cuprammonium fluidity was 20. In each case the initial cuprammonium fluidity was 6.

The invention is further illustrated by the following example, in which the parts and percentages are by weight.

*Example*

A slurry containing 3 per cent by weight of cellulose was formed by stirring purified air-dry pulp in sheet form into a 21 per cent aqueous caustic soda solution containing 20 parts per million of cobalt acetate, a rapidly rotating propeller stirrer being used to obtain a rapid disintegration of the wood pulp sheet in the tank. The temperature of the slurry was then raised to 40° centigrade and the slurry was then aerated and stirred by passing a stream of air through the hollow shaft of the propeller stirrer and out into the slurry through perforated nickel thimbles on the ends of the propeller stirrer. The temperature of the bath throughout aeration was maintained at approximately 40° centigrade.

After three hours a sample of the slurry was removed, neutralised with acetic acid and the cuprammonium fluidity of the cellulose determined in a 1 per cent solution, the fluidity being found to be 15. This slurry was therefore useful for making high tenacity threads, for example according to the process described in U. S. Patent No. 2,192,074 in which the viscose is coagulated in a dilute acid bath containing sulphuric acid and also sufficient metallic sulphates to delay the decomposition to cellulose hydrate and the filaments after leaving the coagulating bath are stretched in the presence of hot dilute acid at a temperature of at least 60° centigrade. After 5 hours total aeration the fluidity was found to be 20 and the slurry useful for making viscose rayon textile threads.

What we claim is:

1. A slurry steeping process for the production of alkali cellulose which can be converted into viscose without further ripening which comprises in combination, the steps of forming a slurry of cellulose fibers in aqueous caustic soda solution containing from 17 to 25 per cent of caustic soda and a soluble cobalt compound in a proportion not exceeding 40 parts by weight of cobalt per million parts by weight of solution, maintaining the temperature of the slurry within the range of 35° to 45° centigrade and passing a stream of gas containing free oxygen through the slurry until the fluidity of the cellulose is reduced to the value desired for viscose production.

2. A slurry steeping process as claimed in claim 1 wherein a stream of air is passed through the slurry.

3. A slurry steeping process as claimed in claim 1 wherein a stream of oxygen is passed through the slurry.

4. A slurry steeping process for the production of alkali cellulose which can be converted into viscose without further ripening which comprises, in combination, the steps of forming a slurry of cellulose fibers in aqueous caustic soda solution containing cobalt acetate in a proportion not exceeding 40 parts by weight of cobalt per million parts by weight of solution, maintaining the temperature of the slurry within the range of 35° to 45° centigrade and passing a stream of air through the slurry until the fluidity of the cellulose is reduced to the value desired for viscose production.

5. A process for the production of viscose which comprises, in combination, the steps of forming a slurry of cellulose fibers in aqueous caustic soda solution containing from 17 to 25 per cent of caustic soda and a soluble cobalt compound in a proportion not exceeding 40 parts by weight of cobalt per million parts by weight of solution, maintaining the temperature of the slurry within the range of 35° to 45° centigrade, passing a stream of gas containing free oxygen through the slurry until the fluidity of the cellulose is reduced to the value desired for viscose production, pressing, converting the pressed alkali cellulose without further ripening to cellulose xanthate by reaction with carbon disulphide and dissolving the cellulose xanthate in aqueous caustic soda to form viscose.

6. A process for the production of viscose which comprises, in combination, the steps of forming a slurry of cellulose fibers in aqueous caustic soda solution containing from 17 to 25 per cent of caustic soda and cobalt acetate in a proportion not exceeding 40 parts by weight of cobalt per million parts by weight of solution, maintaining the temperature of the slurry within the range of 35° to 45° centigrade, passing a stream of air through the slurry until the fluidity of the cellulose is reduced to the value desired for viscose production, pressing, converting the pressed alkali cellulose without further ripening to cellulose xanthate by reaction with carbon disulphide and dissolving the cellulose xanthate in aqueous caustic soda to form viscose.

DONALD ENTWISTLE.
WILLIAM REGINALD WEIGHAM.

REFERENCES CITED

The following references are of record in the file of this patent:

UNITED STATES PATENTS

| Number | Name | Date |
|---|---|---|
| 1,860,432 | Richter | May 31, 1932 |

FOREIGN PATENTS

| Number | Country | Date |
|---|---|---|
| 342,779 | Great Britain | Feb. 9, 1931 |

OTHER REFERENCES

Ott, "Cellulose and Cellulose Derivatives," 1943, pages 743 and 744.